United States Patent
Holmberg et al.

(10) Patent No.: US 9,611,126 B2
(45) Date of Patent: Apr. 4, 2017

(54) METHOD AND SYSTEM FOR AUTOMATICALLY LANDING CONTAINERS ON A LANDING TARGET USING A CONTAINER CRANE

(71) Applicant: ABB TECHNOLOGY LTD, Zürich (CH)

(72) Inventors: Björn Holmberg, Uppsala (SE); Christer Johansson, Västerås (SE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 14/902,791

(22) PCT Filed: Aug. 12, 2013

(86) PCT No.: PCT/EP2013/066781
§ 371 (c)(1),
(2) Date: Jan. 4, 2016

(87) PCT Pub. No.: WO2015/022001
PCT Pub. Date: Feb. 19, 2015

(65) Prior Publication Data
US 2016/0167932 A1    Jun. 16, 2016

(51) Int. Cl.
*G06K 9/00*     (2006.01)
*G01C 3/00*     (2006.01)
(Continued)

(52) U.S. Cl.
CPC ............ *B66C 13/085* (2013.01); *B66C 13/46* (2013.01); *B66C 19/002* (2013.01);
(Continued)

(58) Field of Classification Search
None
See application file for complete search history.

(56) References Cited

U.S. PATENT DOCUMENTS 5,048,703 A * 9/1991 Tax ........................ B66C 13/063
212/273
5,067,013 A * 11/1991 Lindholm ............... B66C 13/46
294/66.2

(Continued)

FOREIGN PATENT DOCUMENTS

DE    44 27 138 A1    2/1996
EP    1 277 691 A1    1/2003
(Continued)

*Primary Examiner* — Randolph I Chu
(74) *Attorney, Agent, or Firm* — Birch, Stewart, Kolasch & Birch, LLP

(57) ABSTRACT

A method for automatically landing a container on a landing target using a container crane is disclosed. The container crane includes a trolley and spreader for holding and lifting the container and a crane control system for controlling movements of the container crane. A distance from the container to the landing target is measured and the container is moved towards the landing target dependent on the measured distance. A plurality of images of the landing target is made using at least one camera mounted on the spreader. The images are processed to identify one or more landing features in the images of the landing target. Distances from the container to the landing target are calculated based on a measurement of distance between the container and the landing features in the images. A video control unit, a system for controlling automatic landings of a container, a computer readable data carrier comprising a computer program and a computer program product arranged for carrying out the methods are also described.

20 Claims, 7 Drawing Sheets

Image from spreader camera

(51) Int. Cl.
*G01C 5/00* (2006.01)
*B66C 13/08* (2006.01)
*B66C 13/46* (2006.01)
*B66C 19/00* (2006.01)
*G06K 9/62* (2006.01)

(52) U.S. Cl.
CPC ....... *G06K 9/00791* (2013.01); *G06K 9/6212* (2013.01); *G06K 9/6215* (2013.01)

(56) References Cited

U.S. PATENT DOCUMENTS

| | | | | |
|---|---|---|---|---|
| 5,089,972 | A | * | 2/1992 | Nachman ................ B66C 13/46 414/139.7 |
| 5,114,295 | A | * | 5/1992 | Jansson ................ B66C 19/007 212/326 |
| 5,142,658 | A | * | 8/1992 | McMorran ............. B66C 13/46 180/167 |
| 5,760,415 | A | * | 6/1998 | Hauck ...................... G01V 8/20 250/559.31 |
| 6,081,292 | A | * | 6/2000 | Lanigan, Jr. .......... B66C 19/007 114/264 |
| 6,182,843 | B1 | * | 2/2001 | Tax ........................ B66C 13/46 212/270 |
| 6,256,553 | B1 | * | 7/2001 | Erikkila ................ B66C 13/063 212/284 |
| 7,106,883 | B2 | * | 9/2006 | Uchida ................ B66C 13/085 348/95 |
| 7,123,132 | B2 | | 10/2006 | Heidenback et al. |
| 7,289,876 | B2 | | 10/2007 | Lüssen et al. |
| 7,508,956 | B2 | * | 3/2009 | Scheppmann ..... G06K 9/00785 348/148 |
| 7,950,539 | B2 | | 5/2011 | Henriksson |
| 2002/0024598 | A1 | * | 2/2002 | Kunimitsu ............. B66C 13/46 348/159 |
| 2012/0092643 | A1 | * | 4/2012 | Rintanen ................ B66C 13/46 356/4.01 |
| 2013/0120577 | A1 | | 5/2013 | Austefjord et al. |
| 2014/0046587 | A1 | * | 2/2014 | Rintanen ................ G01S 7/4808 701/469 |
| 2015/0291400 | A1 | * | 10/2015 | Rintanen ................ B66C 13/46 700/214 |
| 2015/0327211 | A1 | | 11/2015 | Aramoto et al. |

FOREIGN PATENT DOCUMENTS

| | | |
|---|---|---|
| JP | 62-197689 A | 9/1987 |
| JP | 2001-97670 A | 4/2001 |
| JP | 2005-263373 A | 9/2005 |
| KR | 10-2004-0022841 A | 3/2004 |
| KR | 10-2004-0027805 A | 4/2004 |
| KR | 10-2009-0125830 A | 12/2009 |
| KR | 10-2011-0069205 A | 6/2011 |
| WO | WO 2013/046941 A1 | 4/2013 |

* cited by examiner

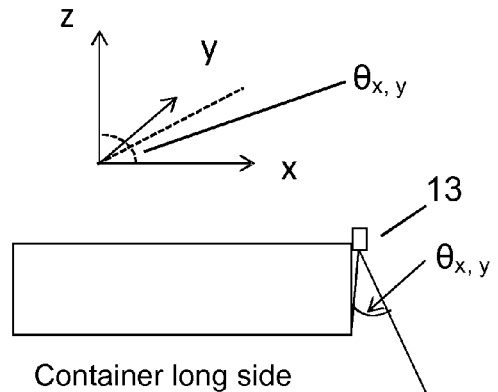
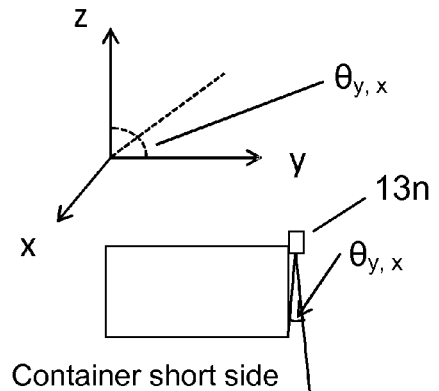
Container long side
Container short side
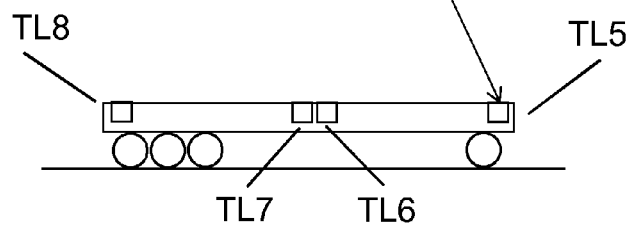
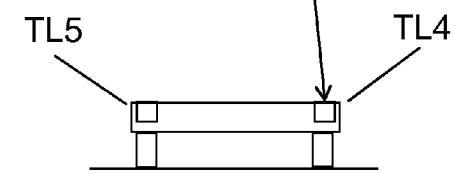
Fig 5a
Fig 5b
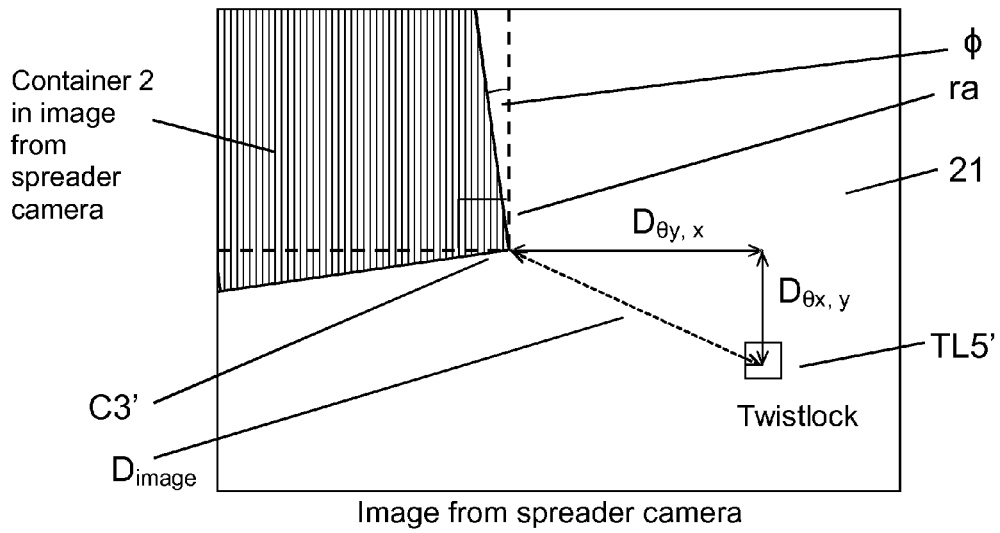
Fig 6

METHOD AND SYSTEM FOR AUTOMATICALLY LANDING CONTAINERS ON A LANDING TARGET USING A CONTAINER CRANE

TECHNICAL FIELD

The invention relates to a crane, such as a container crane. In particular it relates to a method for automatic landing of a container on a vehicle chassis or other landing target in a container terminal.

TECHNICAL BACKGROUND

Container cranes are used to handle freight containers and especially to transfer containers between transport modes at container terminals, freight harbours and the like. Standard shipping containers are used to transport a great and growing volume of freight around the world. Transshipment is a critical function in freight handling. Trans-shipment may occur at each point of transfer and there is usually a tremendous number of containers that must be unloaded, transferred to a temporary stack, and later loaded on to another ship, or back onto the same ship or loaded instead onto another form of transport.

A freight terminal is conventionally operated by a partly computerized Terminal Operating System (TOS) that calculates loading and unloading schedules for each container coming into or leaving the terminal, as well as for each container that has to be moved around from one stack to another in the yard of the freight terminal. The terminal operating system generally issues a work order for each time a container has to be moved and preferably the work order also identifies both the container and the vehicle that has been scheduled to transport the container.

The development of automated cranes has improved loading and unloading and made the productivity more predictable, and also eliminated many situations in which port workers have been exposed to danger and injury. Loading and unloading the ship is seen as a critical stage or a bottleneck in terms of freight handling as the ships are idle in port during the time that loading/unloading takes place. To reduce this idle time the container cranes are normally run continuously on long shifts until the loading or unloading of each ship is completed.

A container crane uses a number of powerful electric motors mounted on a hoist or spreader and on a trolley to power the moving parts and wind in or let out the wire ropes or cables used to lift up or down a spreader holding a container. Electric motors are also used to power the movements of the trolley holding the spreader to lift and transport the containers out of the ship and onto a truck chassis or a stack etc. on land, or vice versa if loading.

To achieve the shortest unloading and loading times container handling equipment has to be at least partly automated in normal operation. The width of shipping containers is standardised at 8 ft, but the height varies between from 8 and 9.5 ft. The most common standard lengths are 20 ft and 40 ft long. The 40 ft container is very common today and even longer containers up to 53 ft long are also in use. International standard dimensions are based on a number of ISO recommendations made between 1968 and 1970, and in particular a recommendation R1161 from January 1970 which made recommendations about dimensions of corner fittings for standard containers. One could say that the distances between corner fittings on standard shipping containers are standarised in accordance with the ISO recommendations. The corner fittings, also known as corner castings, include standard openings so that a container may be picked up by inserting a hook of a crane, or spreader, into each of the four corner fittings at the top of the container. The size and shape of the oval-shaped openings were defined in another standard ISO 1161 from 1984. The same type of corner fittings, eg those on the bottom of a container, may be used to lock a container in place in a position (eg in a hold or on deck) onboard a ship or on a wagon or a chassis. A vehicle chassis is commonly equipped with a number of locking devices called a twistlock. The twistlocks are arranged on the chassis to interlock with the opening in the corner fitting of each corner of the container, eg with the corners on the bottom of the container. By interlocking with the corner fittings using twistlocks in a chassis a container is securely fastened to a vehicle chassis or railway wagon etc.

Each ship-to-shore (STS) container crane and automated stacking crane (ASC) has a lifting device usually incorporating a spreader of some kind that directly contacts a container. The spreader grips the container using hooks or other fittings to engage with the standard sized opening in the corner fittings on the container, to lift it, lower it and release it. In this description the term spreader is used to denote a part of a lifting device that is in direct contact with a container. Spreaders are normally designed to handle more than one size of container, typically 20-40 ft or 20-40-45 ft long containers. A spreader may at any one time lift and handle one single 40 ft or a 45 ft container or two 20 ft containers. Modern spreaders are adjustable in use so that the same spreader can be used to pick up one 20 ft, or two 20 ft containers at a time by adjusting the length of the spreader.

U.S. Pat. No. 7,123,132 entitled Chassis alignment system, and assigned to ABB, describes a method for aligning a truck chassis with a required position relative to a crane, in which method the truck or truck chassis is scanned by a laser scanner. This method is suitable for use with a STS crane where the container load is supported on wire ropes when being hoisted and/or transported. The use of wire ropes to support a hanging load presents additional challenges of measuring and adjusting for container movement in the form of the container swaying. While a container is being lifted from the ship, moved towards the quayside and truck chassis, and subsequently lowered towards the truck chassis the container may also develop undesirable movement in the directions of skew, list and/or trim as described in U.S. Pat. No. 7,950,539 entitled: Load control device for a crane; and assigned to ABB. The crane control system currently used by ABB for the ASC cranes is in addition arranged with four downward-looking cameras mounted on the spreader. These cameras are used to provide images to a remote human operator of all four corners of a container as the container is moved towards a landing target in order to allow manual operation of the crane by the remote operator.

In the former U.S. Pat. No. 7,123,132 named above the laser scanner is located sufficiently high up on the structure of the crane such that it is able to scan a plurality of loading/unloading lanes. A truck is scanned when it enters into one of the loading/unloading lanes in order to detect/identify at least one edge of the truck. Preferably the laser scanner detects a straight edge in the form of a horizontal beam on the rear end of the chassis. The distance between the identified edge of the truck and a fixed point on the crane may be measured in one action.

U.S. Pat. No. 7,106,883 entitled: Container position measuring method and device for cargo crane and container landing/stacking method; assigned to Mitsubishi Heavy Industries Ltd, describes a method for landing a container. In particular it describes mounting one or two CCD cameras on one side of a spreader pointing downwards to make images of a container held by the spreader and/or a second container positioned below the suspended container as a landing target. Processing of image data from a CCD camera is described wherein a long edge (representing the long side) or a short edge (representing the short side—width) of a container held by a hoisting accessory (spreader) is identified, which method is referred to as "edge extraction". When more than one long edge is identified in an image, the edge that is most long is assumed to represent the edge of the side being searched for on the held or target container. It is said that relative position for a suspended container and a target container may be detected accurately and reliably by utilizing edge extraction.

A computerized system used by ABB for autolanding a container on a chassis in a freight terminal today, called Target Positioning System (TPS), is based in part on measurements of truck chassis position made using a laser scanner that is located on the trolley of the crane. The position of a moving container held by a spreader suspended from the trolley and being landed by an STS crane may be automatically controlled and measured as previously described above.

However, as the speed with which container cranes handle containers has increased it has become more of a challenge to find the position of a chassis quickly and with high accuracy using the laser scanner mounted on the trolley of the crane. The type of vehicle chassis that are only used in the terminal area, often called a terminal chassis, may be recognized more easily by fitting such terminal chassis with container landing guides (or locating guides) with a known size and appearance, such as the terminal chassis 39 shown in FIG. 9 (Prior Art). Such guides are designed with prominent straight edges to make easily recognized targets for laser scanners. However, vehicles that travel outside of the terminal, herein called a road chassis, may not have any such standard structures fitted to them to facilitate reliable laser detection. A road chassis may present a difficult challenge in order to recognize a particular road chassis and measure a distance to it, accurately as well as quickly.

Despite the teachings of the above documents improvement in landing of containers on a vehicle chassis is still required. Improved processes for landing containers on other landing targets such as on the top container in a stack would be beneficial. A quicker or more accurate process for landing containers on a temporary or interim landing target would also be beneficial. This is so when unloading a large number of containers it is advantageous if certain containers can be landed on a temporary landing target or rack quickly by the same container crane in order that unloading is not held up by eg a landing target that is temporarily blocked. To summarise, it would be an advantage to be able to reduce the time it takes to unload containers from a ship.

SUMMARY OF THE INVENTION

The aim of the present invention is to provide a method that solves some of the above problems. Advantageous embodiments are described in sub-claims to the independent claims.

In a first aspect of the invention a method for landing a container on a landing target using a container crane is disclosed, said container crane comprising a trolley and a spreader for holding and lifting the container, and a crane control system for controlling movements of said container crane, wherein a first distance from the container to the landing target is measured and the container is moved towards the landing target dependent on the measured distance from container to landing target, wherein the method comprises
  making a plurality of images of the landing target and the container using at least one camera mounted on the spreader,
  identifying or more landing features in the images of the landing target,
  calculating one or more distances from the container to the landing target based on one or more measurements made in the images between the container and the one or more landing features,
  and providing a second distance to the crane control system for landing the container on the landing target.

A novel feature of the method lies in the use of similar triangles, also known as Thale's Theorem or Intercept Theorem, to calculate distance to a landing feature on a chassis by finding a 3D position of the landing feature in respect to a crane coordinate system. The 3D positions are also estimated statistically based on a 2D histogram of the intersections of the rays from the cameras to the landing features, e.g. twistlocks, corner fittings on a chassis, etc. The statistical processing provides robustness because the method is not based on a single snapshot of one or more landing features or structures on the chassis but instead based on an accumulation of images of the sought landing features or structures on the chassis in every time instance.

According to an embodiment, a method is disclosed for landing a container on a landing target using a container crane comprising a trolley and a spreader for holding and lifting the container, and a crane control system for controlling movements of said container crane, comprising the steps of identifying at least one corner of a container and at least one landing feature in the images of the landing target, and calculating the second distance from the container to the landing target based on measurements between the at least one corner of the container and the at least one landing feature in the images of the landing target. In this way processing of features identified in the camera images may be carried out at high speed to measure distance in the image and calculate or estimate the (second) horizontal distance between the actual container and landing target.

According to another embodiment, a method is disclosed for landing a container on a landing target using a container crane comprising a trolley and a spreader for holding and lifting the container, and a crane control system for controlling movements of said container crane, comprising the steps of calculating the second distance from the container to the landing target based on the known position of the spreader/container and measurements between the at least one corner of the container and the at least one landing feature in the images of the landing target based on a number of pixels between an identified edge and a landing feature in the image.

According to an embodiment, a method is disclosed for landing a container on a landing target using a container crane comprising a trolley and a spreader for holding and lifting the container, and a crane control system for controlling movements of said container crane, comprising the steps of calculating the distance from the container to the landing target by using similar triangles and the second distance measured in the image between the at least one corner of the container and the at least one landing feature. The advantage of this method is that the relatively simple calculation step of scaling-up measurements in the image to actual distance from container to landing target may be calculated and re-calculated in real time based on repeated measurements in the images without imposing an undue burden on computer processing resources.

According to another embodiment, a method is disclosed for landing a container on a landing target using a container crane comprising a trolley and a spreader for holding and lifting the container, and a crane control system for controlling movements of said container crane, comprising the steps of determining the second distance by calculating a vector sum of a first distance proportional to an angle theta x around a y-axis and a second distance proportional to angle theta y around an x-axis and projecting this vector onto a horizontal plane of the landing target.

According to an embodiment, a method is disclosed for landing a container on a landing target using a container crane comprising a trolley and a spreader for holding and lifting the container, and a crane control system for controlling movements of said container crane, comprising applying statistical filtering to the measurements of distances between identified edges and landing features, or between different landing features in the images of the landing target, to determine which of the measurements are suitable candidates for use to calculate the second distance between the container and the landing target. In this way measurements that have a greater degree of statistical confidence may be identified using real time computer processes.

According to an embodiment, a method is disclosed for landing a container on a landing target using a container crane comprising a trolley and a spreader for holding and lifting the container, and a crane control system for controlling movements of said container crane, comprising the step of estimating an orientation angle phi of at least one camera fixed on the spreader relative to an inclination of a corner of the container relative to a y-axis or an x-axis in a horizontal plane of a coordinate system of the crane.

According to an embodiment, a method is disclosed for landing a container on a landing target using a container crane comprising a trolley and a spreader for holding and lifting the container, and a crane control system for controlling movements of said container crane, comprising calculating a camera orientation from a position of corner of the container in an image of the landing target and adjusting the second distance accordingly.

According to a second aspect of the invention, an apparatus in the form of a video control unit of a container crane is disclosed, which video control unit is configured for landing a container on a landing target using a container crane is disclosed, said container crane comprising a trolley and a spreader for holding and lifting the container, and a crane control system for controlling movements of said container crane, wherein a first distance from the container to the landing target is measured and the container is moved towards the landing target dependent on the measured distance from container to landing target, wherein a plurality of images of the landing target and the container are made using at least one camera, and wherein the video control unit comprises a processor and computer program code configured to make the video control unit carry out the steps to:
receive the plurality of images of the landing target and the container made using the at least one camera mounted on the spreader,
process in a processor of the video control unit, the plurality of images of the landing target,
identify one or more landing features, in the images of the landing target,
calculate one or more distances from the container to the landing target based on one or more measurements made in the images between the container and the one or more landing features,
and provide a second distance to the crane control system for landing the container on the landing target.

According to an embodiment the video control unit of a container crane is disclosed, which video control unit is configured for landing a container on a landing target using a container crane wherein the at least one camera is connected to the video control unit which is configured for sending measurements of the second distance to the crane control system, which second distance is based on the measurements made in the images of the landing target.

According to an embodiment the video control unit of a container crane is disclosed, which video control unit is adapted for landing a container on a landing target using a container crane wherein the video control unit and/or at least one camera is/are connected to the crane control system by a data link adapted for communication of images to the crane control system at high speed and/or high resolution capable of transferring a plurality of megabytes of data per second, Mbytes/s, or preferably at least 30 Mbytes/s. Preferably a high speed Ethernet link is configured using, for example, an optical cable. It is also an advantage to position the video control unit in close proximity to the crane control system in order to facilitate high speed data transfer from the video control unit to the crane control system.

According to an embodiment the video control unit of a container crane is disclosed, which video control unit is configured for landing a container on a landing target using a container crane wherein the video control unit comprises a processor and a memory storage device including computer program instructions and configured for the video control unit to carry out a method for landing a container on a landing target using a container crane.

The video control unit according to the second aspect of the invention which is configured and/or adapted for carrying out the method according to the first aspect of the invention makes a new and inventive use of cameras that have previously been attached to the corners of a spreader unit for another purpose. Such cameras are already present in a container auto-landing system sold by ABB and mentioned in the background to this specification, in which system the cameras are coarsely directed pointing downward from the corners of the spreader. The cameras are adjusted and the images arranged so as to form a good visual input to crane operators located remotely. The adjusted image, see FIG. 6 (Prior Art), enables an operator to see all four corners on the bottom of the container, as well as a vehicle chassis up to the extent that a part or parts of the view are not blocked by the container. Thus the remote operator can visually assess the progress of the landing and control or intervene as necessary. In order to use these existing cameras for measuring purposes to carry out the present invention however, numerical values of the position of each camera have to be accurately determined. These numerical values are acquired by measurements directly on the spreader in a calibration stage prior to use. An angle phi representing the orientation of the cameras relative to an x or y axis in the horizontal plane on the landing target may also be determined.

According to a third aspect of the present invention, a computer program product is provided, which computer program product has computer program code stored on it, which computer program is configured to be loaded into a processor of a computer, a video control unit, controller or crane control system of a container crane, said crane also comprising a trolley and spreader for holding and lifting the container and a crane control system for controlling movements of said container crane, wherein a first distance from the container to the landing target is measured and the container is moved towards the landing target dependent on the measured distance from container to landing target, and such that the computer program when loaded causes the computer, video control unit, controller or crane control system to carry out the steps to:

make a plurality of images of the landing target and the container are using at least one camera, identify one or more landing features in the images of the landing target, calculate one or more distances from the container to the landing target based on one or more measurements made in the images between the container and the one or more landing features, and provide a second distance to the crane control system for landing the container on the landing target.

According to a fourth aspect of the present invention, a computer program product is provided, and a non-transitory, computer readable medium having a program recorded thereon, which computer program is configured to be loaded into a processor of a computer, a video control unit, controller or crane control system of a container crane, said crane also comprising a trolley and spreader for holding and lifting the container and a crane control system for controlling movements of said container crane, wherein a first distance from the container to the landing target is measured and the container is moved towards the landing target dependent on the measured distance from container to landing target, and wherein that the computer program when loaded causes the computer, video control unit, controller or crane control system to carry out the steps to:

make a plurality of images of the landing target and the container are using at least one camera, identify one or more landing features in the images of the landing target, calculate one or more distances from the container to the landing target based on one or more measurements made in the images between the container and the one or more landing features, and provide a second distance to the crane control system for landing the container on the landing target.

According to a fifth aspect of the invention, a system for landing a container on a landing target using a container crane is disclosed, said container crane comprising a trolley and a spreader for holding and lifting the container, and a crane control system for controlling movements of said container crane, wherein a first distance from the container to the landing target is measured and the container is moved towards the landing target dependent on the measured distance from container to landing target, wherein the system comprises a video control unit configured for processing images of landing targets made by at least one camera and wherein the system is adapted and configured to carry out the steps to:

make a plurality of images of the landing target and the container using at least one camera mounted on the spreader, identify one or more landing features in the images of the landing target, calculate one or more distances from the container to the landing target based on one or more measurements made in the images between the container and the one or more landing features, and provide a second distance to the crane control system for landing the container on the landing target.

According to an embodiment the system for landing a container on a landing target using a container crane is disclosed, said container crane comprising a trolley and a spreader for holding and lifting the container, and a crane control system for controlling movements of said container crane, wherein the system is configured for processing the images of the landing target made by the at least one camera to identify one or more landing features in the images of the landing target in a processor or computer of the video control unit.

According to another embodiment the system for landing a container on a landing target using a container crane is disclosed, said container crane comprising a trolley and a spreader for holding and lifting the container, and a crane control system for controlling movements of said container crane, wherein the system is configured for communicating the second distance from the container to the landing target to the crane control system using a data link adapted for communication to the crane control system at high speed and/or high resolution. The use of a high speed data link to communicate the calculated distance measurements from the video control unit to the crane control system ensures that difficulties of time synchronisation between the crane control system and making and processing the camera images are reduced or avoided.

According to an embodiment the system for landing a container on a landing target using a container crane is disclosed, said container crane comprising a trolley and a spreader for holding and lifting the container, and a crane control system for controlling movements of said container crane, wherein the system comprises an optical fibre communication channel arranged connected between any of: the video cameras and the video control unit; the video control unit and the crane control system; the crane control system and the terminal operating system: the video control unit and the terminal operating system. The use of high speed and/or high capacity data links capable of transferring a plurality of megabytes per second, Mbytes/s, such as optical fibre links, between the cameras and the video control unit avoids delays due to potential bandwidth problems in transmitting video images.

According to an embodiment the system for landing a container on a landing target using a container crane is disclosed, said container crane comprising a trolley and a spreader for holding and lifting the container, and a crane control system for controlling movements of said container crane, wherein the system is configured for landing the container on a landing target which is any one of: another container, a container stack, a terminal chassis, a road chassis, a landing rack or a transfer rack. Advantageously a container may be landed on different landing targets to facilitate sorting or transfer logistics by landing a first container on a road chassis, a second container on a railway wagon if required, a third container on a rack or other temporary position, and a fourth container on a chassis all carried out using the same container crane. Thus the time taken to unload a ship is kept to the minimum even when unloading containers onto more than one type of landing target.

It is to be noted that any feature of the first aspect may be applied to the second aspect and the third aspect, wherever appropriate. Likewise, any advantage of the first aspect may equally apply to the second aspect, and/or the third aspect, respectively, and vice versa. Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

A more complete understanding of the method and system of the present invention may be had by reference to the following detailed description when taken in conjunction with the accompanying drawings wherein:

FIGS. 5a and 5b show in schematic diagrams details for the method according to an embodiment of the first aspect of the invention;

FIG. 6 shows a schematic representation of an image made by a video camera of a container and a landing target and of visual details in the image which are used identified and/or measured in an embodiment of the first aspect of the invention;

DESCRIPTION OF THE PREFERRED EMBODIMENTS

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
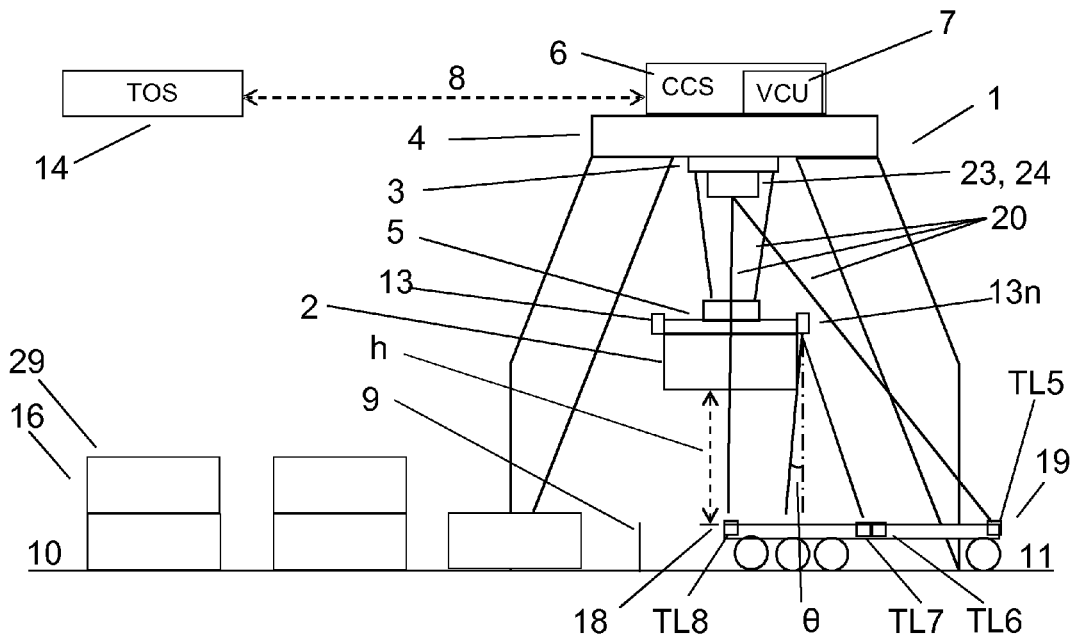
FIG. 1 shows in a simplified schematic diagram a container crane comprising a crane control system, a video control unit and other apparatus for carrying out a method for landing a container on a landing target according to a first aspect of the invention.

FIG. 1 shows a container crane 1 arranged with a trolley 3 and a spreader 5 holding a standard shipping container, container 2. The container crane is arranged in a freight terminal or harbour. Containers in a storage area 10 waiting for further stacking or for dispatch are stacked in a plurality of stacks 29 of containers which may be up to 5 or 6 containers high, or higher. A barrier 9 is positioned to separate the storage area 10 with blocks containing stacks 29 of containers from a transfer area 11 in which one or more container cranes transfer containers, lifts a container up from a ship eg a ship and lands them on a chassis; or transfers from a chassis and lands a container on a ship, a stack 29 or other landing target.

Figure 2:
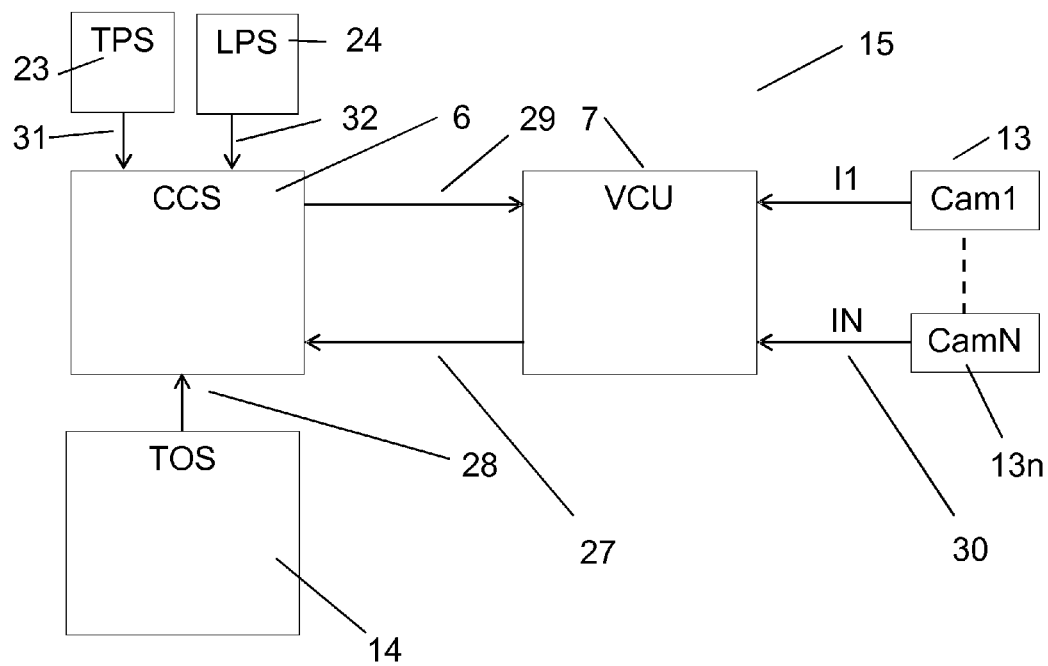
FIG. 2 shows in a schematic block diagram a system for controlling automatic landing of a container on a landing target according to a fifth aspect of the invention.

A container transfer task normally begins with a computerised work order from a supervisory system, such as a Terminal Operating System or TOS. In its simplest form a TOS work order identifies a chassis, a pickup position such as a vehicle lane in the transfer area or a container stack in a block or on a ship; and a destination position. FIG. 2 shows a system for landing containers on a landing target. The figure shows, from right to left, a plurality of video cameras 13, 13n; a video control unit 7, a crane control system 6 for controlling movements of the crane including movements of the trolley and spreader; a Target Positioning System (TPS) system 23, a Load Positioning System (LPS) system 24, and a Terminal Operating System (TOS) 14 which issues work orders for container movement.

The crane control system (CCS) 6 receives a work order from the Terminal Operating System TOS 14. A target positioning system (TPS) is shown mounted on the trolley 3 of the crane 1. Four spreader cameras are shown, each mounted in the extreme corners of the spreader, indicated in the side view in FIG. 1 as cameras 13, 13n. The cameras are preferably digital video cameras such as CCD devices, although an optical camera arranged for analogue to digital image conversion may alternatively be used. The Target Positioning System TPS 23 comprises a laser (not shown) which scans the vehicle lanes in the transfer area to detect and locate the chassis. Preferably also mounted on the trolley 3 is the Load Position System (LPS) 24. The LPS system 24 measures the load position by determining the spreader position by tracking optical markers (not shown) mounted on the top surface of the spreader 5. The crane control system (CCS) 6 communicates with the terminal operating system (TOS) 14. A new an inventive apparatus, a video control unit (VCU) 7 receives and processes images from the cameras 13-13n and calculates a position of the container 2, which data is used to refine the nominal landing position determined by the laser scanner of the TPS and provide a more accurate estimate or measurement of distance from container to landing target.

FIG. 2 shows components of a system 15 for controlling automatic landing of a container on a landing target according to a fifth aspect of the invention. FIG. 2 shows the Terminal Operating System 14, the crane control system CCS 6 and the Target Positioning System 23 and Load Position System 24. A part of the LPS system may be included in the same enclosures as the TPS system, or vice versa. The diagram shows a plurality of cameras, Cam1, 13, to CamN, 13n. A camera eg Cam1 sends image data I1 to the Video Control Unit 7, and camera CamN also sends image data IN to the VCU. The VCU 7 processes the images as will be described in more detail below, and sends extracted and/or calculated information 27 to the crane control system CCS 6 which controls the movements of the container crane 1. The video control unit 7 may be a separate unit in a separate enclosure or may be included in other equipment making up the crane control system 6.

The video images demand considerable bandwidth for both communication and image processing, so that image communication from the cameras to the VCU must be carried out using high speed data connections capable of transferring at a rate of a plurality of Mbytes per second, or more preferably capable of transferring more than 30 Mbyte/s; and communications between the VCU 7 and the CCS 6 must also be high speed using eg high-speed Ethernet connections to avoid timing or synchronization difficulties between the crane control system and the video control unit. For example, an optical fibre communication channel may be arranged connected between any of: the video cameras (13-13n) and the video control unit (7); the video control unit and the crane control system (6); the crane control system and the terminal operating system (14); optionally between the video control unit (7) and the terminal operating system (14).

Figure 4:
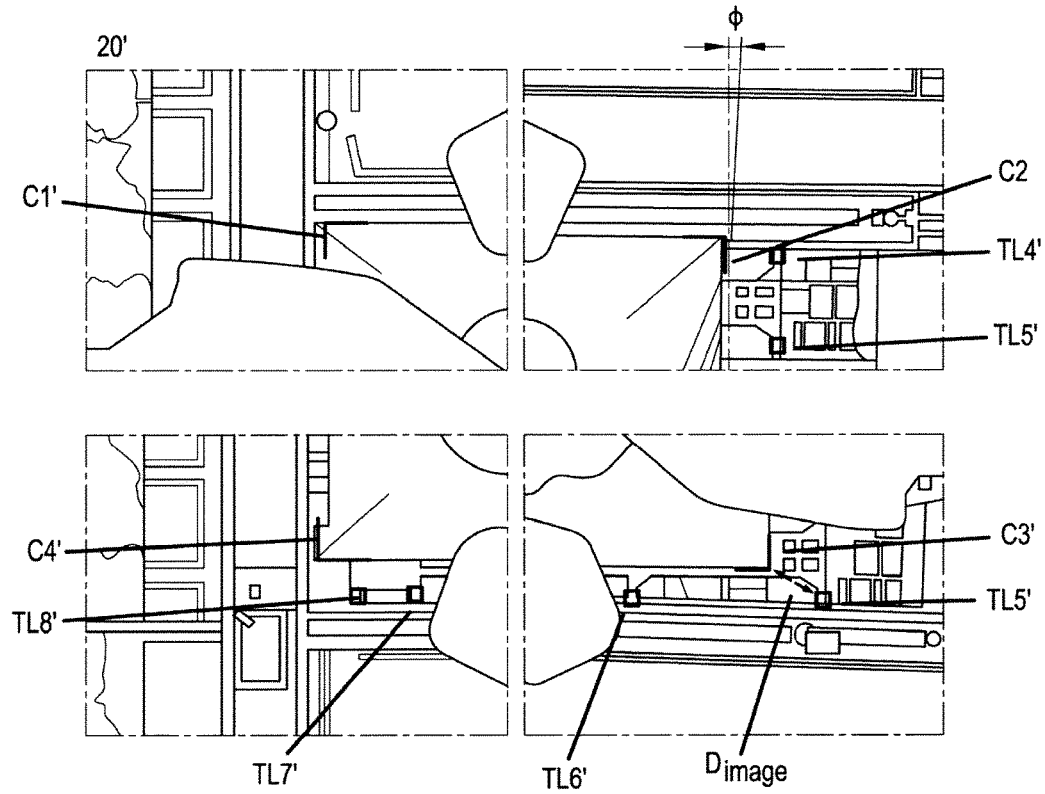
FIG. 4 shows, superimposed on an image comprising images from four cameras, image processing features of the method according to the first aspect of the invention.

The nominal landing position, a first landing distance, is given by the TPS system which sends 31 information to the CCS. The position of the container 2 is measured and calculated by the LPS 24, which sends container position information 28 to the crane control system CCS 6. More precise information about the position of the landing target, which in the exemplary example shown in FIGS. 1, 4, 5 is chassis 19, is sent 27 by the VCU 7 depending on information extracted from the images.

In this description a vehicle chassis is described as the landing target. The term landing target includes a terminal chassis and a road chassis or other vehicles used for transferring or transporting containers including rail-mounted vehicles or wagons. However, the method and VCU control unit 7 and system 15 may also be used for landing a container accurately on other landing targets, such as on a container 16, or a container stack 29 (FIG. 1) or on a rack (not shown), stand or other fixture for holding a container. A rack may be an interim or temporary landing position where the container is stored before being picked up, or after being set down, for example by a type of terminal vehicle designed for transporting containers. When unloading a large number of containers it is advantageous if certain containers can be landed on a temporary landing target or a rack quickly by the same container crane so that unloading is not held up. It may, for example, occur that a destination landing target that has been specified in a work order from the TOS 14 can become blocked temporarily by an unplanned vehicle movement or a breakdown etc. In such cases time may be saved when the same container crane can quickly land a container accurately on a landing rack or other landing target instead of waiting while an obstruction is cleared.

Figure 3:
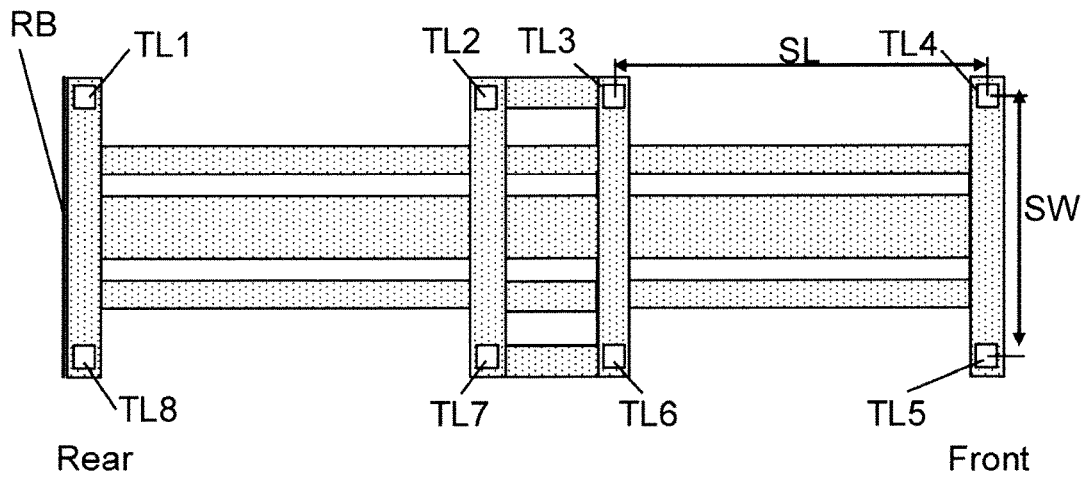
FIG. 3 shows a schematic diagram of a chassis which together with FIGS. 5a, 5b and 6 are used to describe image processing features of the method according to the first aspect of the invention.

FIG. 3 is a schematic diagram of a road chassis seen from above. The road chassis in this exemplary example has 8 twistlocks, TL1-TL8 of the standard type according to ISO standards for intermodal shipping containers. Thus this example of a chassis may carry one 20 ft container arranged on the front, or at the rear, or two 20 ft containers arranged one on the front and the second on the rear. At the rear end of the chassis is a beam RB and the two most rearward twistlocks TL1 and TL8. One 20 foot container at the rear position is secured then by the 4 twistlocks TL1, TL2, TL7 and TL8 located closest to the rear end. A 20 ft container on the front position is secured by twistlocks TL3, TL4, TL5 and TL6. A longer container, for example a 40 ft is secured by twistlocks TL1, TL4, TL5 and TL8.

Figure 8:
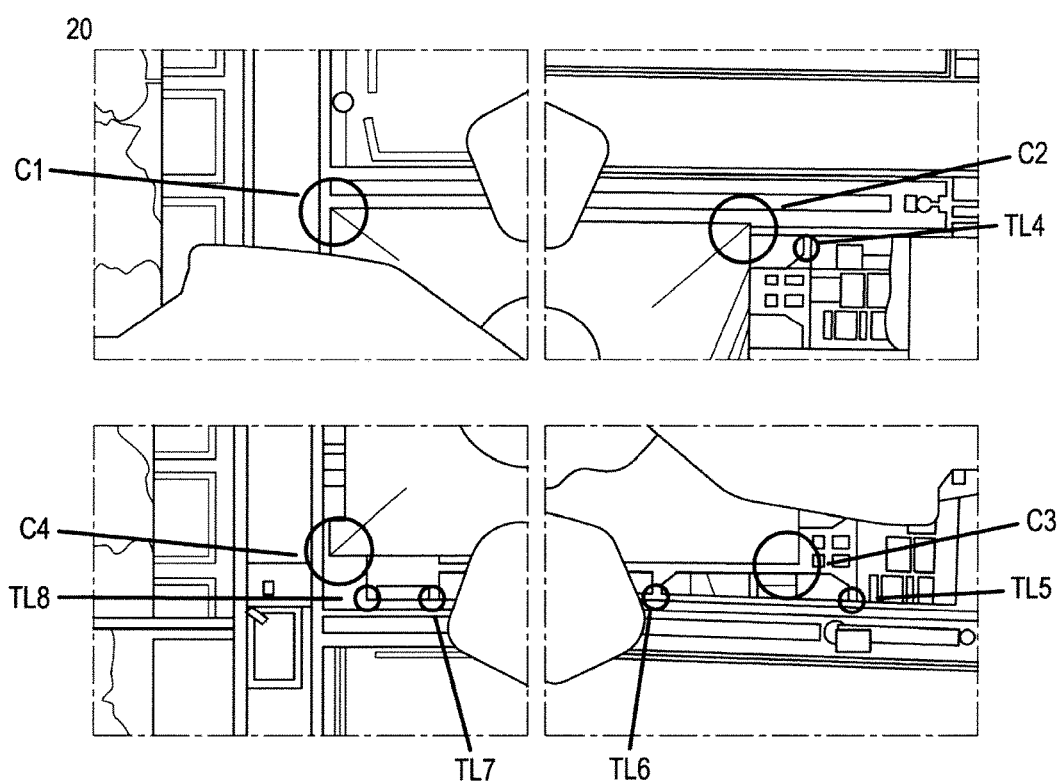
FIG. 8 (Prior Art) shows an image comprising images from four cameras previously used by a crane operator at a remote location to supervise and/or control a container landing.

FIG. 8 shows an image view from the Prior Art. The image is similar to one used by a crane operator using an ABB crane control system. The operator in this case is working from a remote location and not sitting in a cabin attached to the crane, and thus not within line-of-sight of the spreader or container. The operator sees images composed from four video cameras mounted on the four corners of a spreader, looking down. The operator can in this example see all four corners C1-C4 at the bottom of the container held by the spreader. The operator can also see some of the twistlocks TL4-TL8 that are used to secure the corner fitting of a container and lock it onto the chassis. In this exemplary image, the actual chassis has 8 twistlocks, but twistlocks at positions 1, 2 are obscured by the container, and only the remaining twistlocks, in a clockwise direction, TL4, TL5, TL6, TL7 and TL8 are visible in the image seen by the operator. When supervising a landing, the remote operator visually examines an image such as the one shown, and makes sure that the container corners are moving toward one or more twistlocks. The operator slows down the landing or takes over manual control as she/he decides it is necessary.

Figure 7:
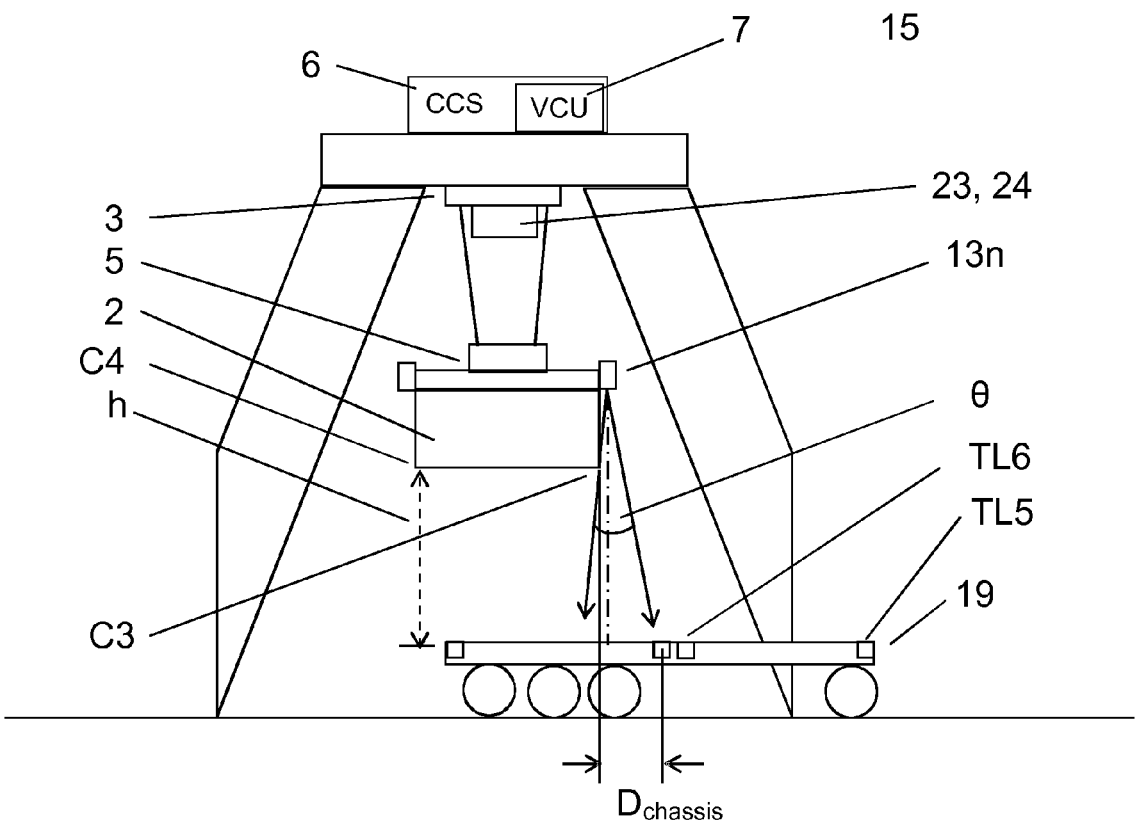
FIG. 7 shows in a simplified schematic diagram relational or geometric details used in the method according to the first aspect of the invention.

FIG. 7 shows schematically another view of the system 15 for controlling automatic landings of a container on a landing target including the cameras 13-13n on the spreader 5, the hanging container 2 and a chassis 19 which is the exemplary landing target. The downward pointing cameras such as camera 13n are fixed in position on the spreader, and the accurate numerical position of precisely where on the spreader each camera is fixed is recorded in a calibration process (normally carried out separately or offline). The camera has been directed so that it makes an image of the bottom of the container, including the nearest container corner. The image also contains visual features on the landing target, which are called landing features. The landing features may include one or more twistlocks TL1-TL8; or corner shapes or straight edges of the chassis, such as the rear beam RB, in the chassis construction. Using such existing structures as landing features is preferable to adding dedicated markers to every road and/or terminal chassis. In FIGS. 1 and 7 the twistlocks are indicated as small rectangles protruding somewhat above the chassis 19, but this is only to make it easier to identify the relative position of the twistlocks in the diagram. Two or more substantially straight lines are to be found arranged in a rectangular pattern in the twistlocks on most chassis, corresponding approximately to the rectangular-cubic shape of corner fittings.

The vertical distance of the load from the chassis, the height of the load h above a horizontal plane representing the top surface of the chassis is known from the Load Position System (LPS) 24. The height of the horizontal plane of the chassis above the ground is also known from the Target Positioning System TPS 23. To find more accurately position of the load in the horizontal plane of the chassis the images from the cameras 13-13n are processed. The processing is done in one or more computers or processors of a control unit such as in the video control unit 7. A part of which image processing may also or instead be carried out in a controller such as a PLC or in a processor of another crane system such as the CCS system 6.

Images are made showing part of the container as well as the chassis or other landing target. FIG. 4 shows essentially the same exemplary image from FIG. 8 (Prior Art) but FIG.

4 has been marked up in a different way to explain the methods of the invention. FIG. 4 shows substantially the same image composed together from the four video cameras mounted on the four corners of a spreader 5, looking down. The figure shows 5 twistlocks, TL4-TL8 which in FIG. 4 are each marked with a small rectangle. The images also show all four corners C1-C4 at the bottom of the container held by the spreader, where the edge of each bottom corner in FIG. 4 has been marked-up with a L-shaped line. The image is processed to identify a landing feature such as twistlock TL4, and to recognize a container corner such as C2, and measure a distance in the image between the container corner and the landing feature (eg twistlock). Thus in FIG. 4 the distance between the image TL5' of one twistlock and the image C3' of one corner C3 is measured as the distance $D_{image}$ and that measurement may be scaled up using Intercept Theorem, similar Triangle or Triangulation. Other methods may be used to arrive at a value $D_{image}$ within the scope of the claims. For example groups of pixels in the image may be recognized with the same colour or hue and identified as an edge, in a similar way as described in U.S. Pat. No. 7,106,883 above (Technical Background section).

In the method of the present invention identified edges may be sorted as false or true candidates by comparing distances between twistlock pairs in the image (after conversion to values for the dimensions of container 2) with distances between twistlock pairs on a short edge or a long edge of a standard container. In other words, true and false candidates may be determined by comparing measurements of distance between pairs of the landing features TL1-8 to standard distances SW, SL (see FIG. 3) for a standard shipping container and rejecting each measurement which is out of tolerance for a length (SL) or width (SW) between corner fittings of a standard container. This distance is measured in the 2D histogram that is formed by the triangulated landing features. In this description the word triangulation is used to describe processes used in computer vision for calculating a point in 3-D space which corresponds to an intersection of rays from image points in two 2-D views or a point in 2-D together with a known distance creating a vector in space from a known starting point.

FIGS. 5a and 5b are schematic illustrations of geometric relations between the container and a chassis, showing in particular two angles which are each proportional to a distance measured in the image made by the video camera (s). The angle theta is expressed as a two dimensional angle representing an angle around each of the x and y axes, which are $\theta x, y$ (theta x around the y axis) and $\theta y, x$ (theta y around the x axis). FIG. 6 is a schematic illustration of geometric relations in an image 21 taken from a video camera mounted in a known position above the container 2 on the spreader 5. Visual details in the illustration include at least one container corner C3' and a landing feature twistlock TL5', as well as showing a relative position between them in the image of the landing target.

FIG. 5a shows a container seen from the long side. The Y axis is going perpendicularly into the plane of the paper. The angle calculated relative one first side of the container from a distance between the container corner C3' and the landing feature TL5' in the image taken by the camera is proportional to the angle $\theta x, y$ (theta x around the y axis). In FIG. 5b the x axis is coming out perpendicularly of the plane of the paper. FIG. 5b shows the container from its short side. The angle calculated relative the second side of the container $\theta y, x$ (theta y around x) is proportional to the distance measured between container corner C3' and the landing feature twistlock TL5' in the camera image. These two-dimensional angles are used to calculate the two distances in the horizontal plane on the chassis, a vector sum of which is shown as the distance $D_{image}$ in one single straight line in the horizontal plane between landing features C3' and TL5' in the image, which is proportional to the actual distance between container corner CR3 and landing feature twistlock TL5 on the chassis.

Again referring to FIG. 6, in which measurements of $D_{image}$ made in video camera images 21 of the container corner C3' and a landing feature, such as twistlock TL5' are illustrated. The distance from the corner C3' of the container 2 to the landing feature, twistlock TL5' in the image may be calculated as a distance $D_{image}$ in the x-y horizontal plane, and where $D_{image} = (\theta x, y, \theta y, x)$ That is to say that distance in the image $D_{image}$ may be calculated as the vector sum of:

a first distance (vector) calculated from a first angle $\theta y, x$ (theta y about the x axis), and a second distance (vector) calculated from the second angle $\theta x, y$ (theta x about the y axis) projected on the chassis plane, the horizontal plane of the landing target.

The horizontal position of the container corner, thus the container load, may be calculated according to another embodiment using a Similar Triangles or Intersect Theorem approach, or triangulation. The focal length of the camera is known. In FIG. 6, the camera orientation or the angle φ (Phi) between the camera and the bottom of the container corner is estimated (53, FIG. 11) from the orientation of the container corner in the image. The numerical position of the camera has been previously determined in a calibration process (41, FIG. 11). The vertical position of the load, the vertical height h is known from the LPS. The distance $D_{image}$ (FIG. 4) in the image 21 between the container corner and a landing feature such as a twistlock is determined by triangulation from landing features and the container corners in the camera images I1, IN. The horizontal distance on the upper surface of the chassis $D_{chassis}$ (FIG. 5) between a vertically downward projection of the container corner C2 and the landing target on the chassis is then calculated based on $D_{image}$ by using triangulation or a similar triangles theorem.

Figure 11:
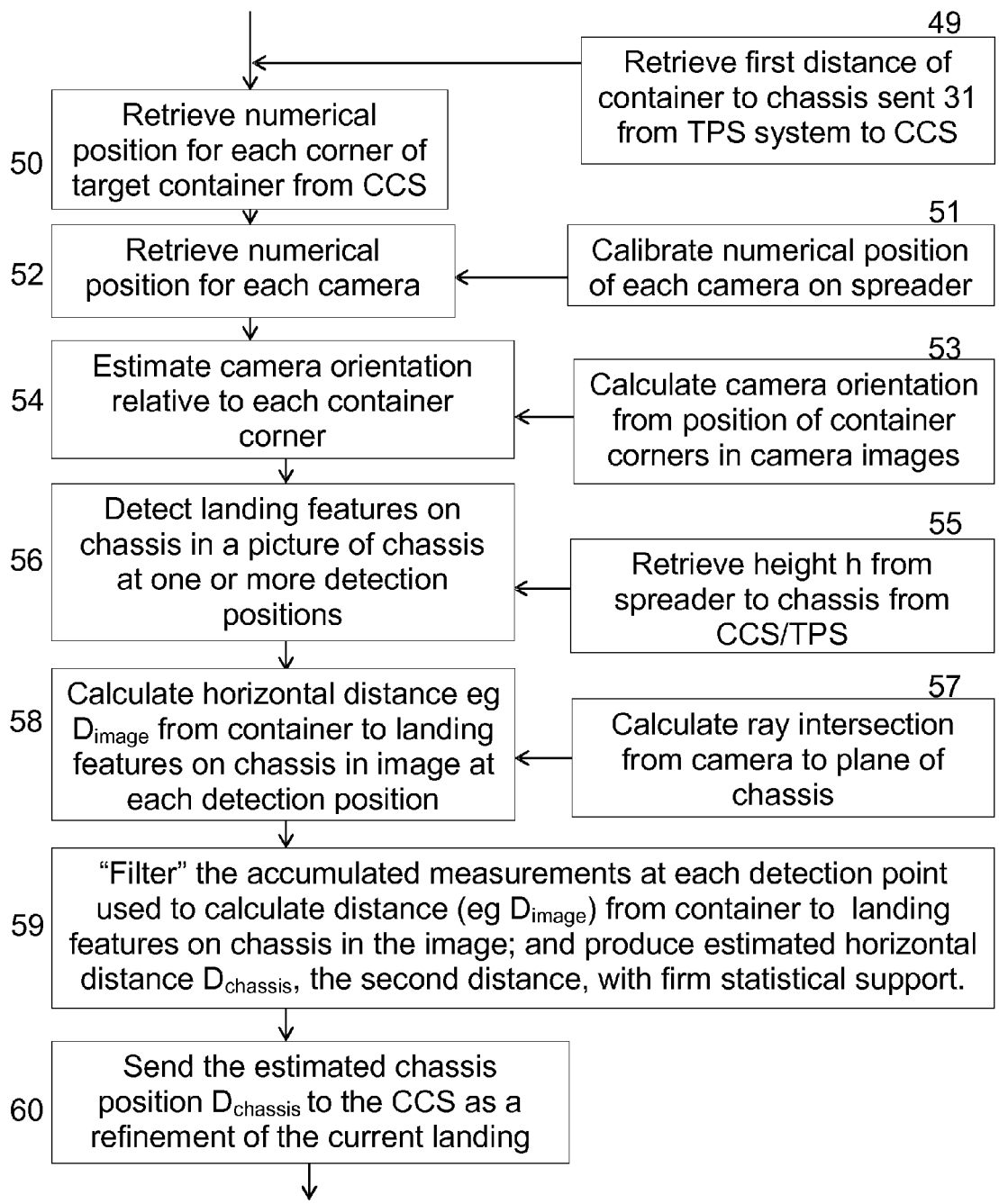
FIG. 11 is a flowchart for steps of a method according to the first aspect of the invention, and FIG. 12 schematically shows a data carrier with computer program code recorded on it according to a fourth aspect of the invention.

FIG. 11 is a flowchart for one or more methods according to the first aspect of the invention. The following steps from the flowchart may be carried out for each container transfer movement:

49 Retrieve the first distance from spreader to chassis or other landing target information sent 31 (FIG. 2) by the TPS system to the crane control system (CCS) system;

50 Retrieve numerical position for each corner of target container from the CCS system 6;

52 Retrieve numerical position (position on the spreader 5 in 3D space) of each camera 13-13n;

53 Calculate camera orientation angle Phi (φ) from position of container corners in camera images, see FIG. 6;

54 Estimate camera orientation relative to each container corner C1-C4;

55 Retrieve height h from spreader to chassis from CCS

56 Detect one or more landing features on chassis or other landing target in an image of the chassis at one or more detection positions;

57 Calculate ray intersection from camera to plane of chassis;

58 Calculate horizontal distance $D_{image}$ from a container corner C1'-C4' to one or more landing features TL1'-TL8' on chassis or other landing target in image at each detection position 59 "Filter" the accumulated measurements at each detection point used to calculate distance (eg $D_{image}$) from container to landing features on chassis in the image; and produce estimated horizontal distance $D_{chassis}$ of container 2 to chassis 19, the second distance, with firm statistical support;

60 Send the estimated, calculated chassis position $D_{chassis}$ to the CCS as a refinement of the current landing position.

Preferably images made of the landing target by means of three or more cameras mounted on the spreader of the container crane are used in the calculations based on measuring distances such as $D_{image}$ between features (eg C3' and TL5') identified in the images.

Certain steps may be carried out in another order. For example in step 49 the first horizontal distance measured by the laser scanner of the TPS system 23 is sent to the crane control system which moves the crane towards the landing target according to the first distance. This first distance information may be included in the steps for calculating the distance based on measurements in the camera images, the second distance. In other embodiments this first distance is used by the CCS but not used in calculations of the second distance.

Certain steps may be omitted. For example, the calibration step 51—Calibrate numerical position of each camera on spreader—is normally carried out on a non-frequent basis and offline, hence normally not carried out for every container lift or landing. Likewise the numerical position for each camera may be used in a calculation for each lift, but the values may be held in working memory during each continuous shift of crane operations. The position of the spreader 5 is known, and thus position of the hoisted container, by means of measuring devices such as encoders installed to measure the amount of wire rope reeled in and/or out by the wire rope hoisting machinery of the spreader and/or trolley. This information may be retrieved, for example from a computer memory storage device unit, data server or data buffer or similar which the CCS has access to for use when calculating a position of the spreader 5 holding the container 2. The method steps may be carried out by processing instructions in a computer program running in a processor of the video control unit. Parts of the computer program may also be run in the crane control system 6, or in other parts of the crane system 15.

Step 59 summarises a statistical filtering of the measurements made of landing features, and of measurements made between the container corners and the landing features in images made by the cameras 13-13n. In each transfer operation the position of the container corners relative to the physical coordinates in the crane coordinate system and the orientation of the cameras 13-13n is required. The orientation is found by identifying the container corners position and orientation in the images, as schematically depicted in FIGS. 1 and 5. This is simplified because the container corner positions are known in the crane coordinate system since the work order contains information on container size (eg 20 ft container or 40 ft container) and the position of the corners in the crane coordinate system is known because the container has been picked up by the spreader 5. The height distance from spreader to chassis is known to the CCS system from the TPS system 23. The distance from container corners to landing features on the chassis or other landing target such as the twistlocks, the rear beam RB, edges representing distances between twistlock pairs, are found by calculating the 3D position of the landing features on the chassis or other landing target. This is done by calculating the ray intersection from the camera to the chassis plane, which is schematically shown in FIG. 5.

The method may also be summarized in the following way.

1) Estimation of the orientation of the camera relative to the container corner. This is achieved by basic background modeling combined with basic recognition and orientation estimation methods. The result from this step is that the orientation of the camera relative to the container is established. This together with the earlier performed calibration step 51 makes it possible to achieve triangulation given the height measurement of the spreader.

2) Detection of landing features on the chassis at different heights above the landing position. A package of image processing and similarity measurement method is applied resulting in multiple candidates for each frame and camera. The result from this step is the image position of a large number of true and false candidates for landing features in the images.

3) Triangulation of the landing features at each detection position and summarizing the findings in a 2D histogram. The 2D histogram is coplanar with the plane of the chassis as measured by the TPS system. The result here is an accumulation of triangulated true and false candidates of landing features now on the 3D plane where the container is about to land.

4) Calculation of refinement to the landing position and sending this refinement 60 to the control system. Based on the 2D landing structure histogram a statistical analysis is applied to sort out the most probable landing features. This step removes the influence of the false candidates from the earlier stages. Basic rigid body position and orientation estimation give the refined reference position that is sent 60 to the crane control system.

Figure 9:
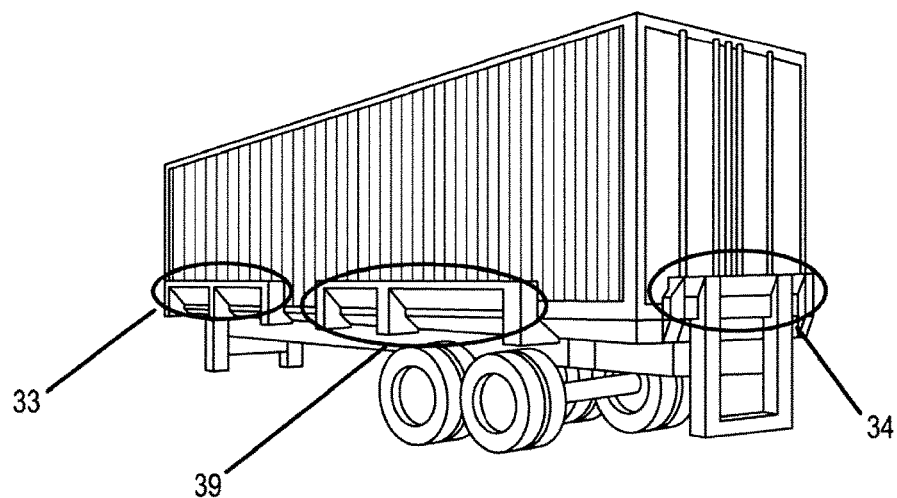
FIG. 9 (Prior Art) shows a terminal chassis fitted with landing guides according to a known method for recognising a terminal chassis.
Figure 10:
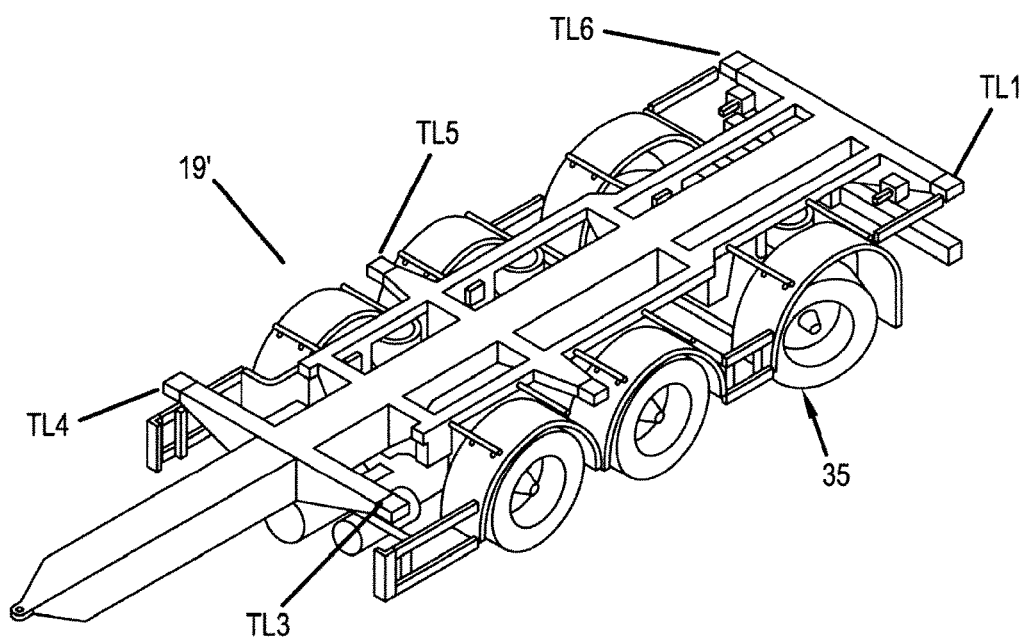
FIG. 10 shows a known road chassis.

FIG. 9 (Prior Art) shows a picture of a container loaded on a terminal chassis 39 which has been fitted with loading guides along the long side 33 and along the short side at the rear end 34 of the terminal chassis. Such loading guides may also have an advantage in that they can mechanically guide a container into position on top of the twistlocks. FIG. 10 (Prior Art) shows a picture of a known road chassis 19' used for transporting containers both inside and outside of the terminal area. In this exemplary example the road chassis has six twistlocks indicated TL1-TL6. The twistlocks on the road chassis shown here exhibit an approximately cubic outer shape and are seen to be mounted substantially flush and level with the upper surface of the chassis. The straight lines and/or the rectangular shape of the twistlocks provide landing features that may be identified in images made by the cameras.

When a work order is retrieved from the Terminal Operating System TOS 14 then information associated to that work order is made available for retrieval by the crane control system 6. Thus when a chassis is identified all information pertaining to the identified chassis, such dimensions as chassis length, is also available to the crane control systems for calculations of twistlock positions on the chassis relative to the measured position of the chassis or container. In addition a loading position (front, rear or centre) has also normally been predetermined for the truck chassis that has been scheduled for loading or unloading according to the TOS work order. Thus for a normal work order the information on chassis length, position on the chassis, may be used by the CCS 6 to calculate at which of the twist lock positions on the chassis the container is going to be landed.

The methods described in this description and in the figures for automatically landing a container on a landing target using a container crane may be carried out automatically by one or more or computerised processes without any need for supervision by or actions from an operator. Methods of the invention may be supervised, controlled or carried out by one or more computer programs. One or more microprocessors (or processors or computers) comprise a central processing unit CPU connected to or comprised in one or more of the above described video control units, controllers, crane control units or the crane control system 6, which processors, PLCs or computers perform the steps of the methods according to one or more aspects of the invention, as described for example with reference to the flowchart of FIG. 11. In particular the video control unit 7 may comprise one or more computers or processors configured with a memory storage device storing computer programs for carrying out the disclosed method. It is to be understood that the computer programs according to the fourth aspect of the invention for carrying out methods according to the invention may also be run on one or more general purpose industrial microprocessors or PLCs or computers instead of one or more specially adapted computers or processors.

Figure 12:
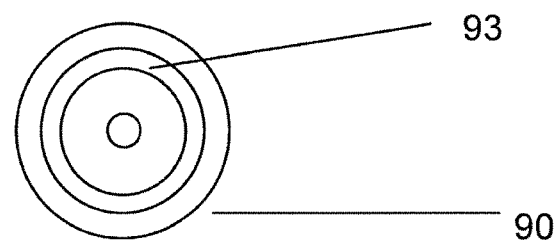

The computer program comprises computer program code elements or software code portions that make the computer or processor in the Video Control Unit 7 and/or in the crane control system or another control unit or controller of the crane control system perform the methods using equations, algorithms, data, stored values, calculations, work order data, chassis data and the like for the methods previously described, and for example in relation to the flowchart of FIG. 11. A part of the program may be stored in a processor as above, but also in a ROM, RAM, PROM, EPROM or EEPROM chip or similar memory means. According to the fourth aspect of the invention, the or some of the programs in part or in whole may also be stored locally (or centrally) on, or in, other suitable non-transitory computer readable medium such as a magnetic disk, CD-ROM or DVD disk, hard disk, magneto-optical memory storage means, in volatile memory, in flash memory, as firmware, or stored on a data server. This computer program code may also be provided on one or more data carriers which perform the functionality of the present invention when the program code thereon is being loaded guiding server or a mobile terminal. One such data carrier 90 with computer program code 93, in the form of a CD ROM disc, is shown schematically in FIG. 12.

The embodiments illustrated and discussed in this specification are only intended to teach those skilled in the art the best way known to the inventors to make and use the invention. The person skilled in the art realizes that the present invention is by no means limited to the examples described. On the contrary, many modifications and variations are possible within the scope of the appended claims. It should therefore be realized that the present invention is only to be limited by the following claims.

The invention claimed is:

1. A method for landing a container on a landing target using a container crane, said container crane comprising a trolley and a spreader for holding and lifting the container, and a crane control system for controlling movements of said container crane, wherein a first distance from the spreader to the landing target as a vertical distance from a point of the spreader to a point of the landing target is measured and the container is moved towards the landing target dependent on the measured first distance from the spreader to the landing target, said method comprising the steps of:

making a plurality of images of the landing target and the container using cameras mounted on the spreader;

estimating camera orientation relative to each container corner;

identifying one or more landing features, in the images of the landing target, at different heights above the landing position, resulting in multiple landing feature candidates for each frame and camera;

calculating horizontal distances from corners of the container to a point(s) of the one or more landing features based on one or more measurements made in the images between the corners of the container and the point(s) of the one or more landing features, wherein the horizontal distances are found by calculating a ray intersection from the cameras to a landing target plane at each detection position;

summarizing findings in a 2D histogram, resulting in an accumulation of true and false candidates of landing features now on a 3D plane where the container is about to land; and providing a second distance from the container to the landing target as a horizontal distance from one of the corners of the container to the point of the landing target to the crane control system for landing the container on the landing target, based on the 2D histogram in a statistical analysis to sort out the most probable landing features.

2. The method according to claim 1, further comprising the steps of:

identifying the one of the corners of the container and one of the one or more landing features in the images of the landing target; and calculating the second distance from the container to the landing target based on measurements between the one of the corners of the container and the point of the one of the one or more landing features in the images of the landing target.

3. The method according to claim 1, further comprising the step of:

calculating the second distance from the container to the landing target based on a known position of the spreader/container and measurements between the one of the corners of the container and the point of one of the one or more landing features in the images of the landing target based on a number of pixels between an identified edge and a landing feature in the image.

4. The method according to claim 3, further comprising the step of:

calculating the second distance from the container to the landing target by calculating, using similar triangles, the horizontal distance between the one of the corners of the container and the point of the one of the one or more landing features based on a distance measured in the image between the one of the corners of the container and the point of the one of the one or more landing features.

5. The method according to claim 1, further comprising the step of:

calculating the second distance from the container to the landing target by calculating, using similar triangles, the horizontal distance between the one of the corners of the container and the point of one of the one or more landing features based on a distance measured in the image between the one of the corners of the container and the point of the one of the one or more landing features.

6. The method according to claim 1, further comprising the step of:
  determining the second distance by calculating a vector sum of a first distance proportional to an angle theta x around y (θx, y) and a second distance proportional to angle theta y around x (θy, x) and projecting this vector onto a horizontal plane of the landing target.

7. The method according to claim 1, further comprising the step of:
  applying statistical filtering to the measurements of distances between identified edges and landing features, or between different landing features, in the images of the landing target to determine which of the measurements are suitable candidates for use to calculate the second distance between the container and the landing target.

8. The method according to claim 1, further comprising the step of:
  estimating an orientation angle phi (φ) of at least one camera fixed on the spreader relative to a corner of the container, or to an inclination of a corner of the container relative to a y-axis or an x-axis in a horizontal plane of a coordinate system of the crane.

9. The method according to claim 1, further comprising the step of:
  calculating a camera orientation phi (φ) from a position of corner of the container in an image of the landing target and adjusting the second distance accordingly.

10. The method according to claim 1, further comprising the step of:
  retrieving a calibrated numerical position of each of the at least one cameras on the spreader.

11. A video control unit of a container crane configured for landing a container on a landing target using a container crane, said container crane comprising a trolley and a spreader for holding and lifting the container, and a crane control system for controlling movements of said container crane, a first distance from the spreader to the landing target as a vertical distance from a point of the spreader to a point of the landing target is measured and the container is moved towards the landing target dependent on the measured first distance from the spreader to the landing target, wherein a plurality of images of the landing target and the container are made using cameras mounted on the spreader, and wherein the video control unit comprises a processor and computer program code configured to make the video control unit carry out steps to:
  receive the plurality of images of the landing target and the container made using the cameras mounted on the spreader;
  estimate camera orientation relative to each container corner;
  identify one or more landing features, in the images of the landing target, at different heights above the landing position, resulting in multiple landing feature candidates for each frame and camera;
  calculate horizontal distances from corners of the container to a point(s) of the one or more landing features based on one or more measurements made in the images between the corners of the container and the point(s) of the one or more landing features, wherein the horizontal distances are found by calculating a ray intersection from the cameras to a landing target plane at each detection position;
  summarize findings in a 2D histogram, resulting in an accumulation of true and false candidates of landing features now on a 3D plane where the container is about to land; and
  provide a second distance from the container to the landing target as a horizontal distance from one of the corners of the container to the point of the landing target to the crane control system for landing the container on the landing target, the second distance being calculated based on the 2D histogram in a statistical analysis to sort out the most probable landing features.

12. The video control unit according to claim 11, wherein the at least one camera is connected to the video control unit which video control unit is configured for sending calculated values of the second distance to the crane control system which are based on measurements made in the images of the landing target.

13. The video control unit according to claim 11, wherein the video control unit and/or at least one camera is/are connected to the crane control system by a data link configured for communication of images to the crane control system at a plurality of megabytes per second or preferably more than 30 Mbytes/s.

14. The video control unit according to claim 11, wherein the video control unit comprises a processor and a memory storage device including computer program instructions and configured for the video control unit to carry out a method to carry out a method for landing a container on a landing target using a container crane.

15. A non-transitory computer-readable medium containing a computer program product for landing a container on a landing target using a container crane, said container crane comprising a trolley and a spreader for holding and lifting the container, and a crane control system for controlling movements of said container crane, wherein a first distance from the spreader to the landing target as a vertical distance from a point of the spreader to a point of the landing target is measured and the container is moved towards the landing target dependent on the measured first distance from the spreader to the landing target, said computer program product comprising computer-executable instructions to:
  make a plurality of images of the landing target and the container using cameras mounted on the spreader;
  estimate camera orientation relative to each container corner;
  identify one or more landing features, in the images of the landing target, at different heights above the landing position, resulting in multiple landing feature candidates for each frame and camera;
  calculate horizontal distances from corners of the container to a point(s) of the one or more landing features based on one or more measurements made in the images between the corners of the container and the point(s) of the one or more landing features, wherein the horizontal distances are found by calculating a ray intersection from the cameras to a landing target plane at each detection position;
  summarize findings in a 2D histogram, resulting in an accumulation of true and false candidates of landing features now on a 3D plane where the container is about to land; and
  provide a second distance from the container to the landing target as a horizontal distance from one of the corners of the container to the point of the landing target to the crane control system for landing the container on the landing target, the second distance being calculated based on the 2D histogram in a statistical analysis to sort out the most probable landing features.

16. A system for landing a container on a landing target using a container crane, said container crane comprising a trolley and a spreader for holding and lifting the container, and a crane control system for controlling movements of said container crane, wherein a first distance from the spreader to the landing target as a vertical distance from a point of the spreader to a point of the landing target is measured and the container is moved towards the landing target dependent on the measured first distance from the spreader to the landing target, wherein a video control unit is adapted and configured for processing images of landing targets made cameras, and wherein the video control unit is configured to carry out the steps of:

making a plurality of images of the landing target and the container using the cameras mounted on the spreader, at different heights above the landing position, resulting in multiple landing feature candidates for each frame and camera;

estimating camera orientation relative to each container corner;

identifying one or more landing features, in the images of the landing target;

calculating distances from corners of the container to a point(s) of the one or more landing features based on one or more measurements made in the images between the corners of the container and the point (s) of the one or more landing features, wherein the horizontal distances are found by calculating a ray intersection from the cameras to a landing target plane at each detection position;

summarizing findings in a 2D histogram, resulting in an accumulation of true and false candidates of landing features now on a 3D plane where the container is about to land; and providing a second distance from the container to the landing target as a horizontal distance from one of the corners of the container to the point of the landing target to landing target to the crane control system for landing the container on the landing target, the second distance being calculated based on the 2D histogram in a statistical analysis to sort out the most probable landing features.

17. The system according to claim 16, wherein processing the images of the landing target made by the at least one camera to identify the one or more landing features in the images of the landing target, is carried out in a processor or computer of the video control unit.

18. The system according to claim 16, wherein sending the second distance to the landing target to the crane control system using a data link adapted for communication to the crane control system at high speed and/or high resolution.

19. The system according to claim 16, wherein an optical fibre communication channel configured for transferring a plurality of megabytes per second Mbytes/s or preferably more than 30 Mbytes/s is arranged connected between any of: the video cameras and the video control unit; the video control unit and the crane control system; the crane control system and the terminal operating system: the video control unit and the terminal operating system.

20. The system according to claim 16, wherein the system is configured for a landing target which is any one of: another container, a container stack, a terminal chassis, a road chassis, a landing rack or a transfer rack.

\* \* \* \* \*